Figure 1:
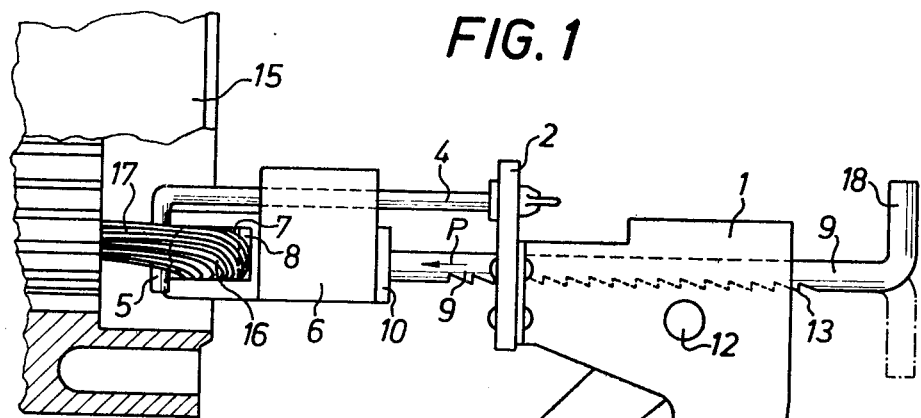

United States Patent [19]

Veser

[11] 4,274,451
[45] Jun. 23, 1981

[54] MOLDING DEVICE FOR THE STATOR COIL WINDING HEADS OF ELECTRIC MACHINES

[76] Inventor: Franz Veser, Kanalstr. 16, D-7980 Ravensburg, Fed. Rep. of Germany

[21] Appl. No.: 66,549

[22] Filed: Aug. 14, 1979

[30] Foreign Application Priority Data

Aug. 16, 1978 [DE] Fed. Rep. of Germany ... 7834310[U]

[51] Int. Cl.³ ............................................. B21F 1/00
[52] U.S. Cl. ................................... 140/106; 29/596; 72/322
[58] Field of Search .................. 140/106, 123, 123.5; 269/214, 6; 29/736, 596; 72/DIG. 2

[56] References Cited

U.S. PATENT DOCUMENTS

| 894,301 | 7/1908 | Wharton | 140/57 |
| 3,144,707 | 8/1964 | Hiestand | 254/108 X |
| 4,032,109 | 6/1977 | Wilson | 254/69 |

*Primary Examiner*—Richard B. Lazarus

[57] ABSTRACT

A molding device to flatten stator coil winding heads by thrusting a hollow forming die with a convex head against draw hooks holding the other side of the winding heads.

4 Claims, 2 Drawing Figures

MOLDING DEVICE FOR THE STATOR COIL WINDING HEADS OF ELECTRIC MACHINES

The invention relates to a molding device for the stator coil winding heads of electric machines, in which the winding head is flattened by impression.

A conventional and still usable process for winding stators consists of manually inserting the loops of wire of a spool consecutively into the stator groove. In so doing, the coil winding head is also shaped manually by bending the individual wires to shape. This time-consuming work is required because the finished coil winding head has a very compact, rigid structure, which prevents molding by hand except in the case of very small stators. In the case of all other sizes, it is necessary to use the cumbersome procedure referred to. The devices used for this purpose, such as, for example, compression struts, require special practice and experience. In addition, the danger exists here of damaging the insulating lacquer. There are special difficulties with multiple-hole and tier windings, because several coil winding heads must be reshaped in order to accommodate them in the limited space of the stator.

In order to replace the time-consuming work of inserting the loops of wire, winding processes have been developed in which the spool as a whole is pushed or pulled into the stator groove. At the same time, an advantageous enlargement of the maximum spool dimensions is also achieved. It therefore follows however that the finished very compact coil winding heads can be molded only with mechanical means. Extensive and expensive mechanical devices have been proposed for this purpose. For smaller or medium-sized companies with small production runs, especially also for the repair plants, the purchase and use of these mechanical devices is totally uneconomic. On the other hand, the shape of the coil winding head, especially in the case of multipolar or tier windings, is very important for suitably accommodating the coil winding heads in the limited space of the stator dimensions.

It is therefore an object of the invention to replace the time-consuming and outmoded manual molding, which is also detrimental to the winding, as well as the expensive special molding machines by a molding device, which can be purchased at little expense and which can be handled easily, while at the same time however the quality of the winding fully meets the requirements of modern winding technology.

The objects of this invention are accomplished by means of a molding device, in which a forming guide and several, preferrable two draw hooks with rods which may be suspended from the sides of the coil winding head, are provided and in which a thrust mechanism with a push rod is present, which can press the forming guide against the coil winding head, while the draw hooks pull in the opposite direction. These means are components of a device which can be operated with one hand and which is equipped with a pistol grip and a control lever, with which a strong, transmitted thrust force can be exerted on the molding tool. Such a molding device enables even an unskilled worker to mold coil winding heads in optimum fashion with a slight expenditure of force. The costs of purchasing the device are so slight, that a molding tool can be made available at each work place, whereby the work routine is assisted. In order to ensure that the designated shape of the coil winding head is precise, a step-by-step switching device is provided inventively for the activation of the push rod, so that the molding process proceeds stepwise and can therefore be controlled constantly.

According to the invention moreover, the pressure side of the forming die is provided with a hollow profile, which corresponds approximately with the cross section of the coil winding head, the profile base being curved convexly in the direction of the pressure. During the molding therefore, the die envelops the coil strand concerned, favoring the molding process and avoiding damage to the lacquer insulation of the wires. The convex profile base readily produces an appropriate indentation of the coil winding head.

Further details of the invention are described by means of the drawing, in which an example of the operation is represented.

FIG. 1 shows a side elevation of the device and

Figure 2:
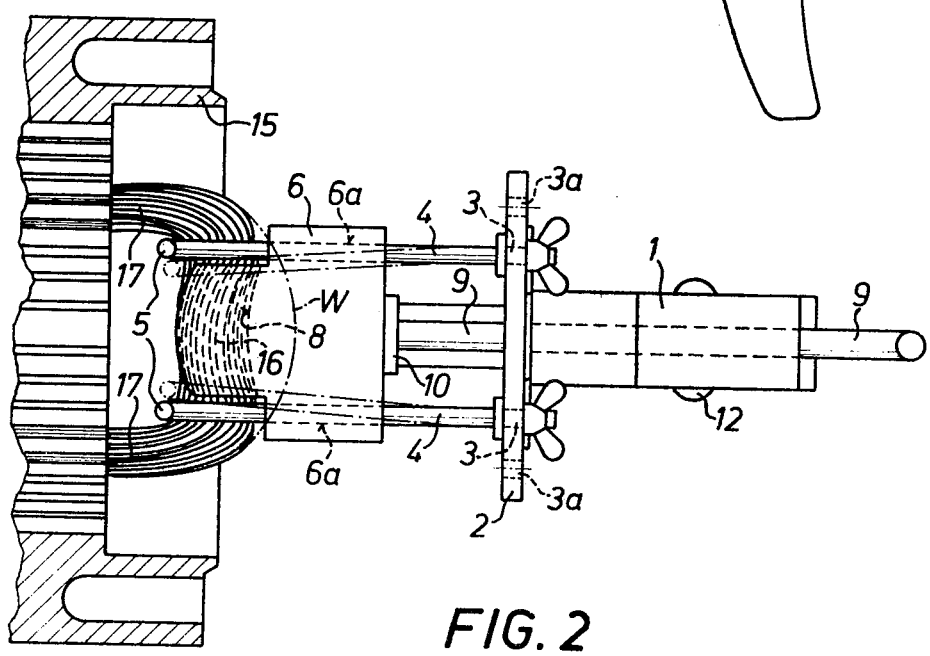

FIG. 2 the view of FIG. 1 from above, with the stator cut open.

To the housing 1 of the device, a pistol-like grip 1a is molded and a flange 2 is fastened, which is provided with boreholes 3, 3a. In two of these boreholes 3, rods 4 are fastened, which have draw hooks 5 at their ends. The forming die 6, which can be displaced longitudinally, is guided by rods 4. The forming die 6 is provided with a hollow profile 7, which has a convexly curved profile 8.

In the housing 1, a longitudinally movable push rod 9 is guided, which adjoins with its pressure plate 10 the forming die 6 and which can be moved in the direction of arrow P by means of the control lever 11. Control lever 11, which is swivel-mounted on axle 12, acts by way of a well-known step-by-step switching device with lever transmission on the teeth 13 of the push rod, the thrust mechanism being designed in a known manner in such a way that, after a rotation of 180° (shown by the line of dots and dashes) the push rod 9 can be disengaged and retracted.

In order to bring the coil winding heads, which initially protrude from the stator 15 approximately according to the dashed and dotted line W, into the appropriate shape shown, that is, to flatten it, the forming die 6 is applied in such a manner that its hollow profile encloses the coil winding head on three sides. At the same time, the draw hooks 5 are applied to the inner distortions of the coil winding head. Subsequently, by activating the control lever 11, the push rod 9 can be moved in the direction of arrow P against the forming die 6, as a result of which the latter exerts a sufficient compressive force stepwise on the azimuth W of the coil winding head 16, flattening or slightly indenting it. In this process, a force of reaction developes in the opposite direction on draw hooks 5, which is responsible for preventing the winding being pressed back into the stator and moreover for insuring that the lateral strands 17 are stored appropriately so that additional coil winding heads may be accommodated.

In order to enhance this effect, the guide surfaces of the forming die 6 can be so designed at the rods, that they converge in the direction of thrust, as is indicated by the dashed and dotted lines. By these means and in cooperation with the appropriately constructed guide grooves 6a, the elastic rods 4 and therefore the draw hooks 5 are pressed outwards by the forward motion of the forming die and so contribute to the intended flattening of the coil winding head.

At the end of the molding process, the push rod 9 is turned by 180° and can then be retracted by the angled handle 18. By so doing, the pressure on the forming die 6 and the draw hooks 5 is also released and these can be brought into a starting prosition.

In order to make the device usable for coil winding heads of different sizes, flange 2 is provided with several pairs of boreholes 3, 3a, in which rods 4 may be mounted at smaller or larger lateral intervals, so that forming dies 6 of different sizes may be inserted. In addition, the length of the draw hooks 5 may be matched to the position and thickness of the coil winding heads. This is particularly appropriate in the case of tier windings. In the case of this type of winding or in the case of multi-hole coil groups, the value of the described device becomes fully evident, because it is possible to mold the coil winding heads, which lie next to or above one another, in such a way that they can be accommodated in an orderly manner in the very tight space of the front side of the stator.

I claim:

1. Molding device for flattening a coil winding head of a stator coil comprising
    a handle having a housing including a pistol grip and a control lever;
    a push rod extending through said housing, one end of said push rod formed as an angle and the other end of said push rod extending longitudinally therefrom;
    a forming die mounted at the other end of said push rod, said forming die having a hollow portion adapted to surround the coil winding head, and said forming die including a convex portion adapted to abut the surface of the coil winding head within said hollow portion;
    mounting means located on said housing;
    a plurality of hook rods extending from said mounting means toward the other end of said push rod, each of said hook rods having draw hooks formed at their remote ends, the length of said hook rods being such that each draw hook abuts the surface of the coil winding head juxtaposed from said convex portion abutment; and
    a thrust mechanism provided within said handle whereby actuation of said pistol grip thrusts said push rod and said mounting die so as to flatten the coil wnding head against a holding force provided by the abutment of said draw hooks.

2. Molding device according to claim 1 wherein respective guide surfaces are located in said forming die to guide each said hook rod, each said guide surface having a diverging configuration to allow each said hook rod to be pressed outwardly during flattening of the coil winding head.

3. Molding device according to claim 1 wherein said mounting means comprises a flange extending from said housing, said flange including a plurality of boreholes corresponding in number to the number of said hook rods, and fastening means being provided to fasten said hook rods in said boreholes.

4. Molding device according to claim 3 wherein additional boreholes are located in said flange to provide selective predetermined locations for said hook rods.

* * * * *